United States Patent
Boezen

(10) Patent No.: US 6,650,144 B2
(45) Date of Patent: Nov. 18, 2003

(54) LINE DRIVER FOR SUPPLYING SYMMETRICAL OUTPUT SIGNALS TO A TWO-WIRE COMMUNICATION BUS

(75) Inventor: Hendrik Boezen, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 126 days.

(21) Appl. No.: 10/022,381

(22) Filed: Oct. 30, 2001

(65) Prior Publication Data

US 2002/0105364 A1 Aug. 8, 2002

(30) Foreign Application Priority Data

Nov. 1, 2000 (EP) .............................. 00203805

(51) Int. Cl.$^7$ .......................... H03K 19/0175
(52) U.S. Cl. .......................... 326/82; 326/86
(58) Field of Search .............................. 326/82, 83, 86, 326/21

(56) References Cited

U.S. PATENT DOCUMENTS 3,641,370 A * 2/1972 Heimbigner ................ 327/172
4,849,751 A * 7/1989 Barber et al. .......... 340/825.02
5,208,776 A * 5/1993 Nasu et al. ................. 365/200

* cited by examiner

Primary Examiner—Don Le
(74) Attorney, Agent, or Firm—Steven R. Biren

(57) ABSTRACT

A line driver for driving a two-wire communication bus (8, 9) consisting of a chain of inverters (I1, . . . , I6). Each inverter may consist of a series arrangement of a PMOS (M1) and an NMOS (M2) transistor. The output terminals (1b, 3b, 5b) of the odd-numbered inverters (I1, I3, I5) are connected to the first wire (8) of the bus through respective first resistors (R1, R3, R5) and the output terminals (2b, 4b, 6b) of the even-numbered inverters (I2, I4, I6) are connected to the second wire (9) of the bus through respective second resistors (R2, R4, R6).

Owing to the propagation delay of the inverters and the additive effect of the resistors the voltages on the bus wires change only in successive small steps. This results in a small common mode voltage on the bus wires and, consequently, a low electromagnetic emission.

5 Claims, 3 Drawing Sheets

LINE DRIVER FOR SUPPLYING SYMMETRICAL OUTPUT SIGNALS TO A TWO-WIRE COMMUNICATION BUS

The invention relates to line drivers for supplying symmetrical output signals to a two-wire communication bus. The communication bus consists of two wires, usually a twisted pair. If the signals on both wires of the twisted pair are exactly symmetrical, the electromagnetic fields radiated by both wires cancel, one another and there is no electromagnetic emission. Commonly, one tries to design the individual drivers for both bus wires to generate signals with identical slopes. For that purpose the drivers should start at exactly the same time since any difference in timing results in severe electromagnetic emission. This design goal is difficult to implement. The drivers for both bus lines may have different speed, for the positive and negative slopes of the output signals, for example because transistors of different conductivity type are used for the positive and negative slopes.

It is an object of the invention to provide a line driver which supplies highly symmetrical output signals to a two-wire communication bus, even at high speed.

To this end the invention provides a line driver as claimed in claim 1. Due to the propagation delay of the inverters the output terminals of all inverters down the chain change polarity one after the other. This results in a series of small voltage increases on the first wire, which voltage increases are linked to small voltage decreases on the second wire. A next small voltage step on the first wire only happens after the previous step on the second wire has finished.

In a preferred embodiment the delay function and the drive function of the line driver are separated by inserting additional inverters between the output terminals of the inverters and the resistors.

The inverters preferably have a PMOS transistor and a NMOS transistor connected in series between supply lines of a supply voltage source. Thus, each inverter of the chain is simple and the performance of the line driver is independent of the characteristics of the individual PMOS and NMOS transistors.

The line driver according to the invention can be used, for example, in Controller Area Network (CAN) bus systems in cars, provided that diodes are inserted in the connections to the bus wires to enable multiple line drivers to be used on the same CAN bus.

The above and other objects and features of the present invention will become more apparent from the following detailed description considered in connection with the accompanying drawings, in which.

Like reference symbols are employed in the drawings and in the description of the preferred embodiments to represent the same or very similar item or items.

Figure 1:
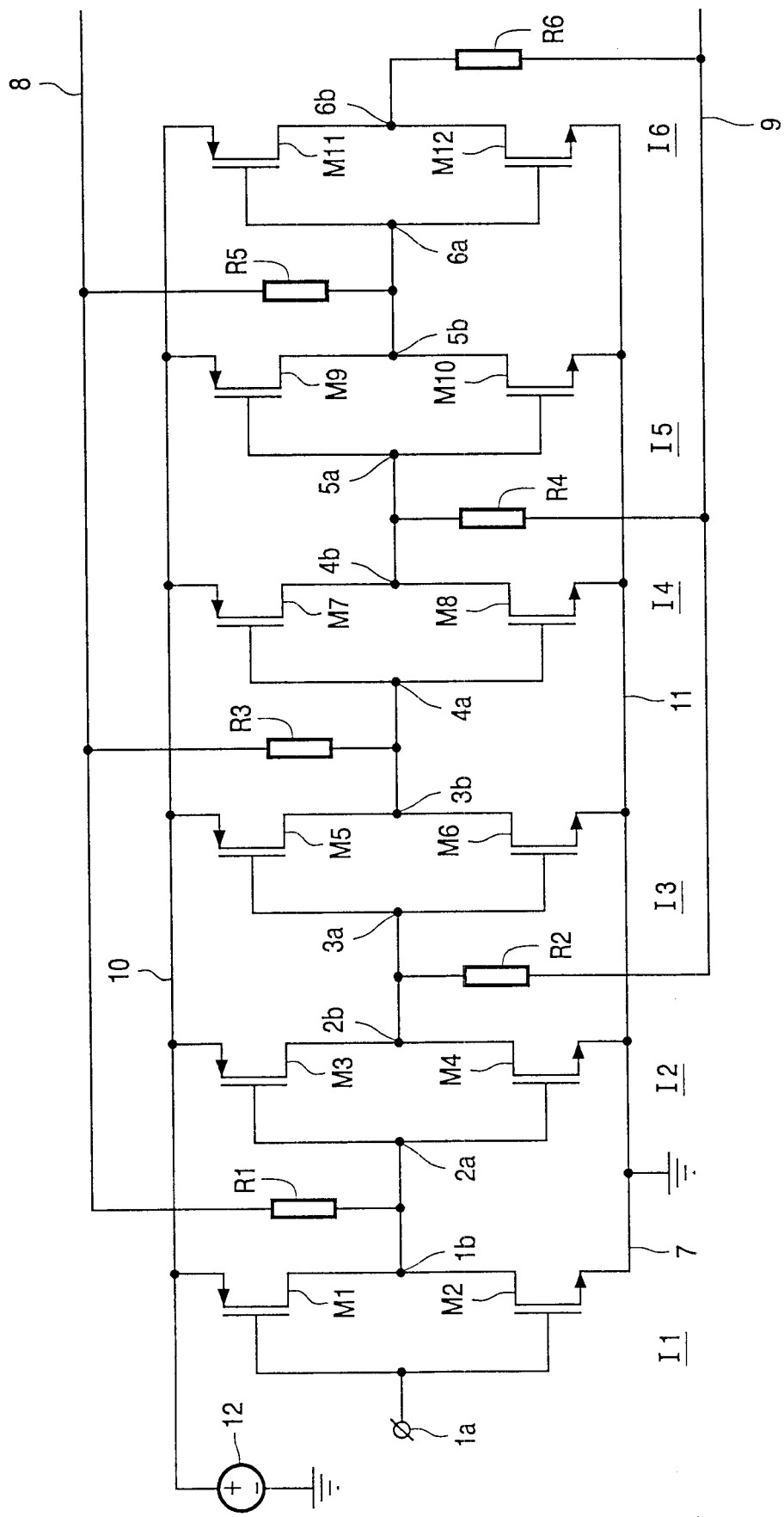
FIG. 1 is a circuit diagram of a first embodiment of a line driver according to the invention.

FIG. 1 shows a circuit diagram of a first embodiment of a line driver according to the invention. The line driver consists of a chain of six cascaded inverters I1, I2, . . . , I6. The number of cascaded inverters is preferably even for reasons of symmetry, but if so desired an odd number of inverters may be used. The number six has been chosen by way of example; less or more inverters may be cascaded.

The inverters I1, I2, I3, I4, I5 and I6 have respective input terminals 1a, 2a, 3a, 4a, 5a, 6a and output terminals 1b, 2b, 3b, 4b, 5b and 6b. The input terminal 1a of the first inverter I1 receives the data signal to be transmitted on the bus. The input terminal of each subsequent inverter in the chain receives the output signal of the previous inverter in the chain. For this purpose the input terminal 2a of the second inverter I2 is connected to the output terminal 1b of the first inverter I1, the input terminal 3a of the third inverter I3 is connected to the output terminal 2b of the second inverter I, et cetera.

The inverters I1, I2, I3, I4, I5 and I6 each comprise a series arrangement of a PMOS transistor and an NMOS transistor, M1–M2, M3–M4, M5–M6, M7–M8, M9–M10, M11–M12, respectively. The source of the PMOS transistor M1 of the first inverter I1 is connected to a positive supply line 10 of a supply voltage source 12 and the source of the NMOS transistor M2 of the first inverter I1 is connected to a negative supply line 7 of the supply voltage source 12, which negative supply line 7 servers as signal ground. The drains of the PMOS transistor M1 and the NMOS transistor M2 are connected to the output terminal 1b of the first inverter I1, and the gates of the PMOS transistor M1 and the NMOS transistor M2 are connected to the input terminal 1a of the first inverter I1. The sources, drains and gates of the PMOS and NMOS transistors of the other inverters I2 to I6 are connected in a similar way to the positive and negative supply lines and to their respective output and input terminals. The inverters can also be realized with bipolar PNP and NPN transistors.

The output terminals 1b, 3b and 5b of the odd-numbered inverters I1, I3 and I5 are connected to a first wire 8 of the two-wire communication bus through respective resistors R1, R3 and R5. The output terminals 2b, 4b and 6b of the even-numbered inverters I2, I4 and I6 are connected to a second wire 9 of the two-wire communication bus through respective resistors R2, R4 and R6. The resistors enable an addition of inverter output signals on the bus wires.

Figure 2:
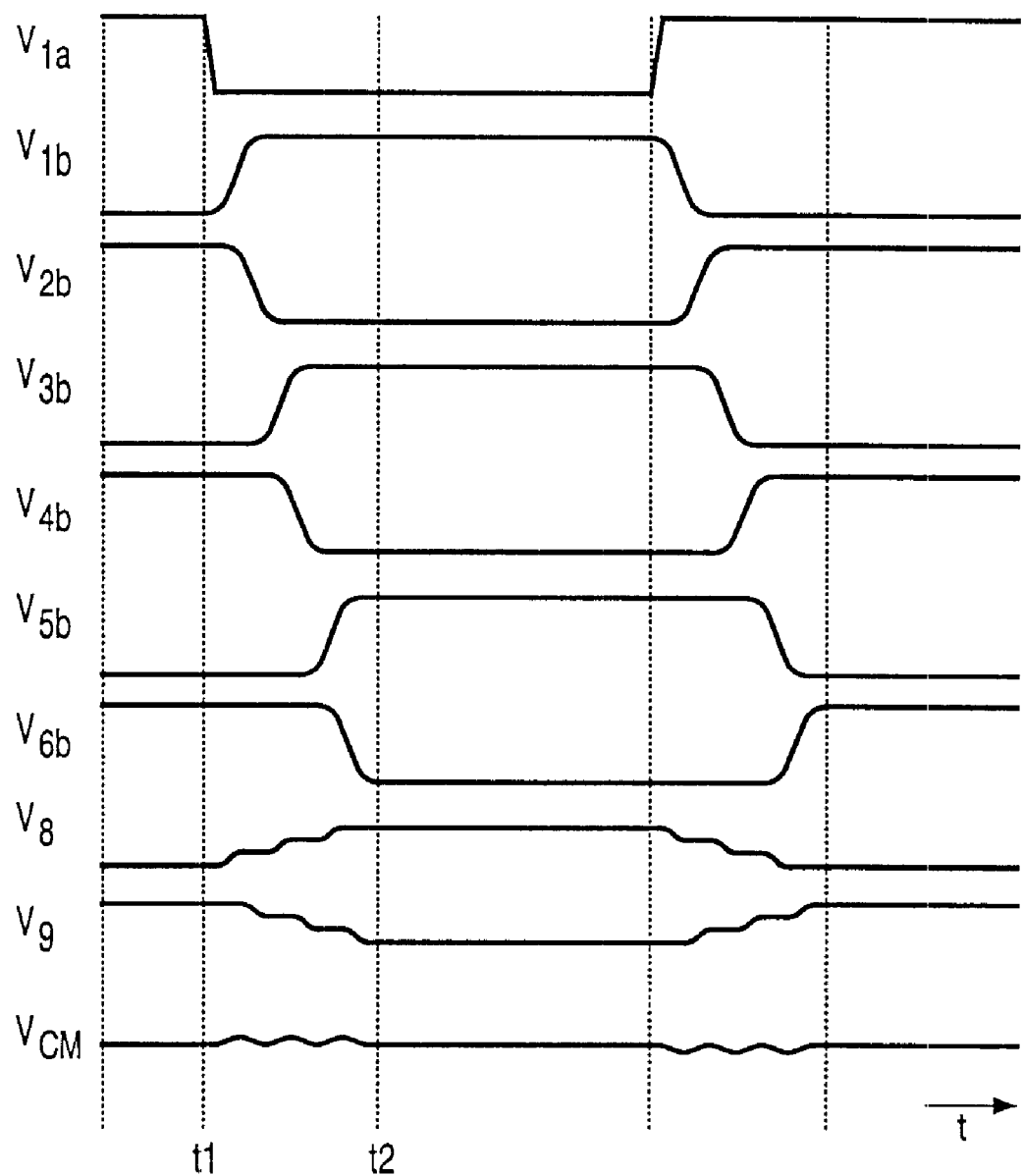
FIG. 2 shows waveforms of signals occurring in the line driver of FIG. 1.

FIG. 2 shows waveforms of signals occurring in the line driver of FIG. 1. The waveforms show voltages with respect to the ground level as function of the time t. Initially (t<t1), the voltage V1a on the input terminal 1a is high, and the voltages V1b, V3b and V5b on the output terminals 1b, 3b and 5b are driven towards ground level by NMOS transistors M2, M6 and M10, respectively, and the voltages V2b, V4b and V6b on the output terminals 2b, 4b and 6b are driven towards the positive supply voltage level by NMOS transistors M3, M7 and M11, respectively. The voltage V8 on the first bus wire 8 is negative with respect to the voltage V9 on the second bus wire 9.

At an instant t1 the voltage V1a goes from high to low. As a consequence the voltage V1b on the output terminal 1b goes from low to high, but only after a short delay caused by the propagation delay of the first inverter I1. When this happens, the voltages V3b and V5b on the output terminals 3b and 5b will still be low and the voltage V8 on the first bus wire 8 increases by a small step. After yet another delay, caused by the propagation delay of the second inverter I2, the voltage V2b on the output terminal 2b will go low, while the voltages V4b and V6b on output terminals 4b and 6b remain still high. This results in a small decrease of the voltage V9 on the second bus wire 9. In this way the voltages on the output terminals change polarity, i.e. from high to low or from low to high, one after the other resulting in a series of small voltage increases on the first bus wire 8 and a series of small voltage decreases on the second bus wire 9. Each subsequent voltage step on the one bus wire only occurs after a previous step on the other bus wire has (nearly) finished. At an instant t2 all output terminals have changed polarity and the voltages V8 and V9 remain stable until the next low to high voltage jump of the voltage V1a.

Voltage VCM is the common mode voltage of the voltages V8 and V9, which is a measure of electromagnetic emission. The emission is low due to the successive small voltage steps on the two bus wires.

The number of voltages steps may be increased by making the chain longer, for example by connecting 22 inverters in cascade. The total duration t2–t1 of the transients in the voltages V8 and V9 then increases, but the symmetry also increases.

To avoid signal reflections on the line the resistance value of the resistors R1 to R6 is preferably adapted to the line impedance of the two-wire communication bus. For example, if the bus is a twisted pair with a 120 ohm characteristic impedance, then each of the two wires should see 60 ohm. In the example of FIG. 1 each of the resistors R1 to R6 should have a resistance value of 3*60=180 ohm. This value may be corrected for with the ON-resistance of the PMOS and NMOS transistors.

Figure 3:
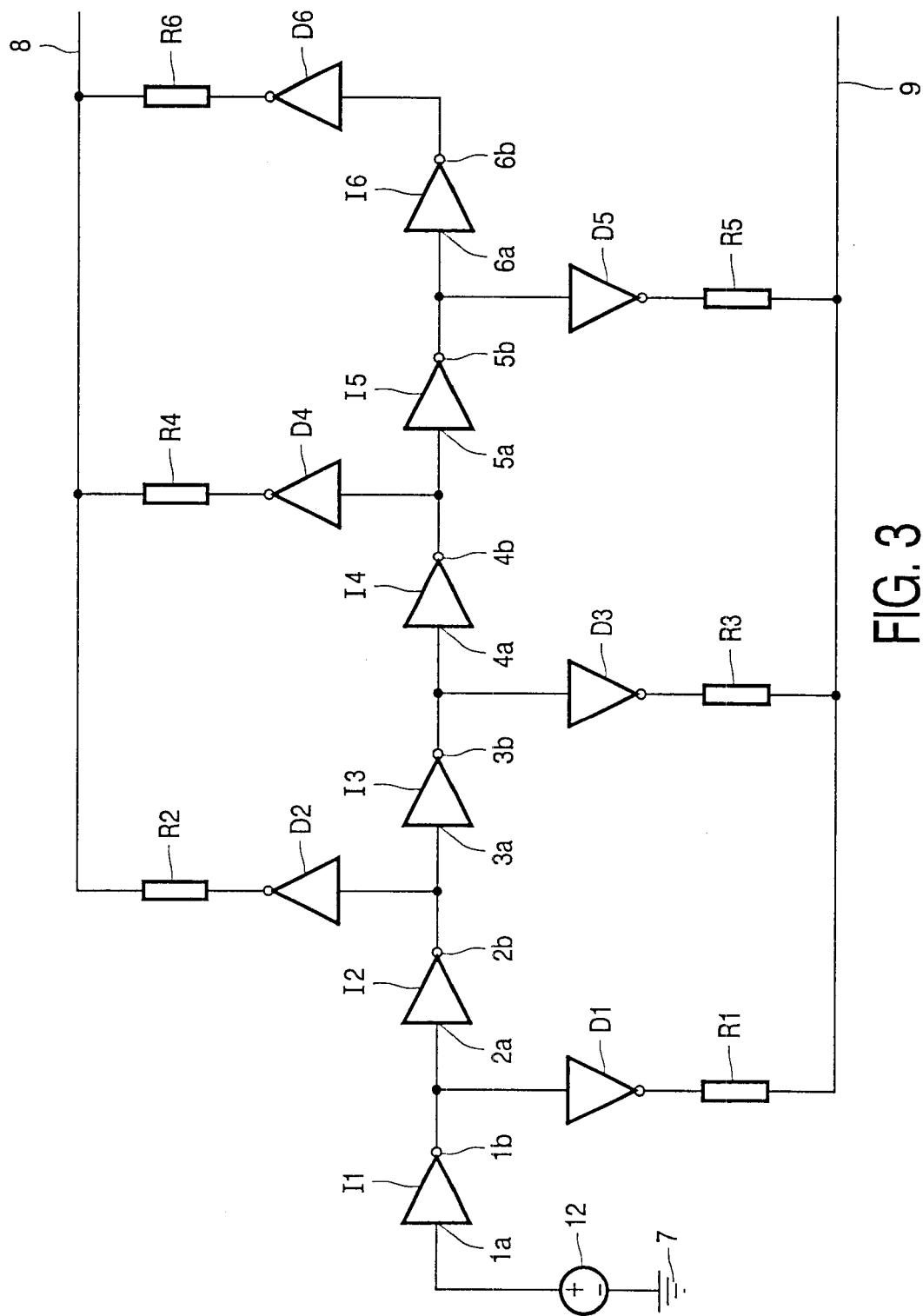
FIG. 3 is a circuit diagram of a second embodiment of a line driver according to the invention.

FIG. 3 shows a circuit diagram of a second embodiment of a line driver according to the invention. Respective drivers D1 to D6 have been inserted between the outputs 1b to 6b of the inverters I1 to I6 and the resistors R1 to R6 to separate the delay function from the driving function of the line driver structure. If the delay of the odd-numbered drivers D1, D3, D5 is slightly greater than the delay of the even-numbered drivers D2, D4, D6, then the positive going voltage steps in the voltage V8 on the first bus wire 8 and the negative going voltage steps in the voltage V9 on the second bus wire 9 will occur at substantially the same instant and the ripple in the signal VCM will become very small. For that purpose the delay difference between the even and odd drivers should be equal to the delay of an inverter I1 in the chain.

The shown embodiments of the line driver can be used, for example, in Controller Area Network (CAN) bus systems in cars, provided that diodes are inserted in the connections to the bus wires in order to enable multiple line drivers on the same CAN bus to assume both dominant and recessive states.

What is claimed is:

1. A line driver for driving a first (8) and a second (9) wire of a communication bus in response to an input signal, comprising:

a chain of cascaded inverters (I1, I2, . . . , I6), an input terminal (1a) of the first inverter (I1) of the chain being connected to receive the input signal, and the input terminal (2a, . . . , 6a) of each subsequent inverter (I2, . . . , I6) of the chain being coupled to an output terminal (1b, . . . , 5b) of the previous inverter of the chain; and resistors (R1, R3, R5; R2, R4, R6) for coupling output terminals (1b, 3b, 5b) of odd-numbered inverters (I1, I3, I5) of the chain to the first wire (8) and for coupling output terminals (2b, 4b, 6b) of even-numbered inverters (I2, I4, I6) of the chain to the second wire (9).

2. A line driver as claimed in claim 1, wherein the line driver comprises further inverters (D1, . . . , D6) inserted between the output terminals (1b, . . . , 5b) and the resistors (R1, . . , R6).

3. A line driver as claimed in claim 1, each inverter comprising a series arrangement of complementary transistors (M1, M2; M3, M4; . . . ; M11, M12) having corresponding output electrodes coupled to the output terminal (1b, 2b, . . . , 6b) of the inverter and having corresponding input electrodes coupled to the input terminal (1a, 2a, . . . , 6a) of the inverter.

4. A line driver as claimed in claim 2, each further inverter (D1, . . . , D6) comprising a series arrangement of complementary transistors having corresponding output electrodes coupled to a respective one of the resistors (R1, . . . , R6) and having corresponding input electrodes coupled to the output terminal (1b, 2b, . . . , 6b) of a respective one of the cascaded inverters (I1, . . . , I6).

5. A line driver as claimed in claim 3, wherein the complementary transistors are a PMOS transistor (M1, M3, . . . , M11) and an NMOS transistor (M2, M4, . . . , M12), connected in series between supply lines (10, 7) of a supply voltage source (12).

* * * * *